Dec. 26, 1939.  C. A. BICKEL  2,184,684
FORM PRODUCING MACHINE
Filed Aug. 18, 1937   10 Sheets-Sheet 1

INVENTOR
CLIFFORD A. BICKEL
BY
Toulmin & Toulmin
ATTORNEYS

Dec. 26, 1939.    C. A. BICKEL    2,184,684
FORM PRODUCING MACHINE
Filed Aug. 18, 1937    10 Sheets—Sheet 2
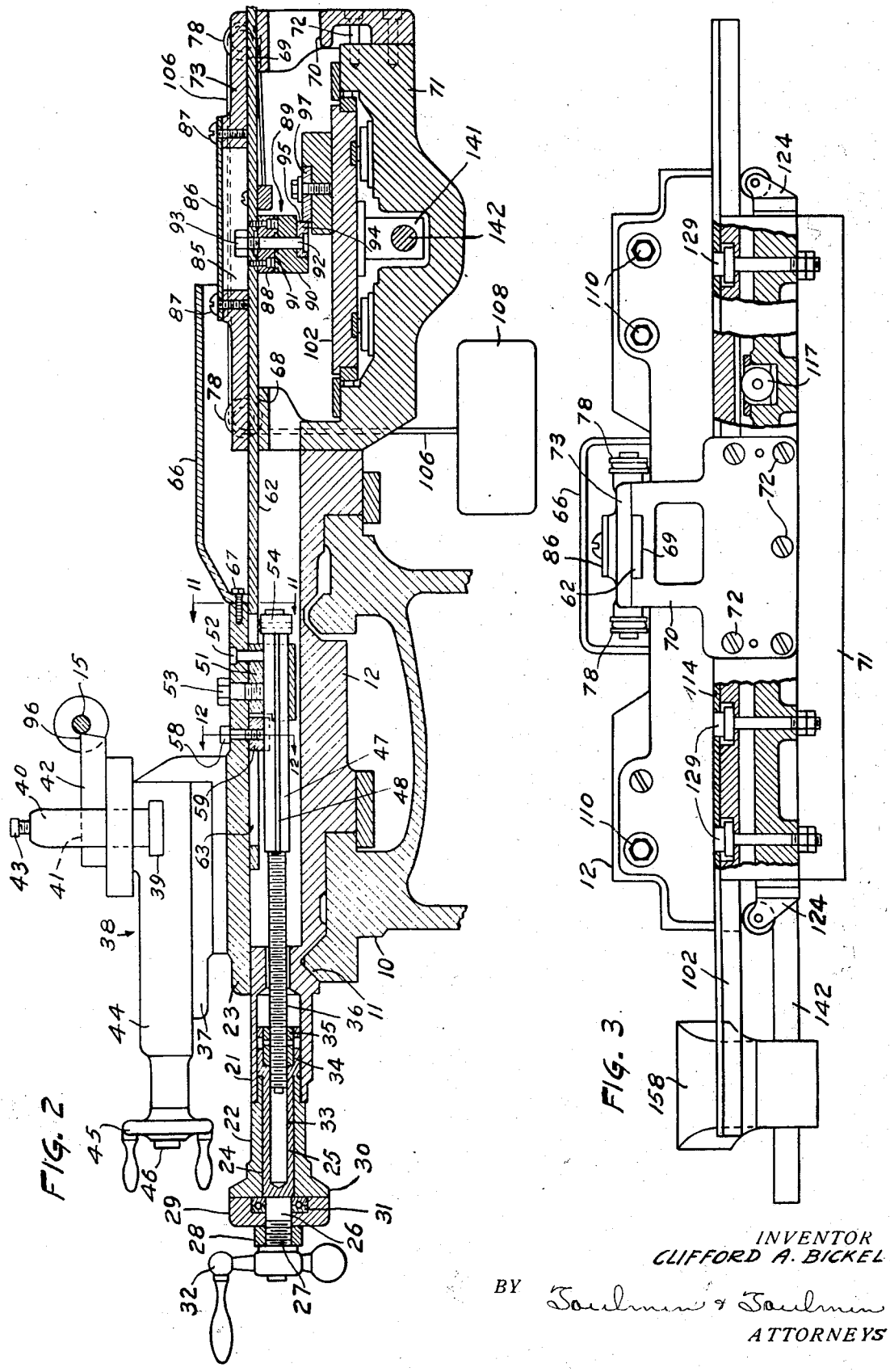
INVENTOR
CLIFFORD A. BICKEL.
BY Toulmin & Toulmin
ATTORNEYS Dec. 26, 1939.    C. A. BICKEL    2,184,684
FORM PRODUCING MACHINE
Filed Aug. 18, 1937    10 Sheets-Sheet 3

INVENTOR
CLIFFORD A. BICKEL.
BY
ATTORNEYS

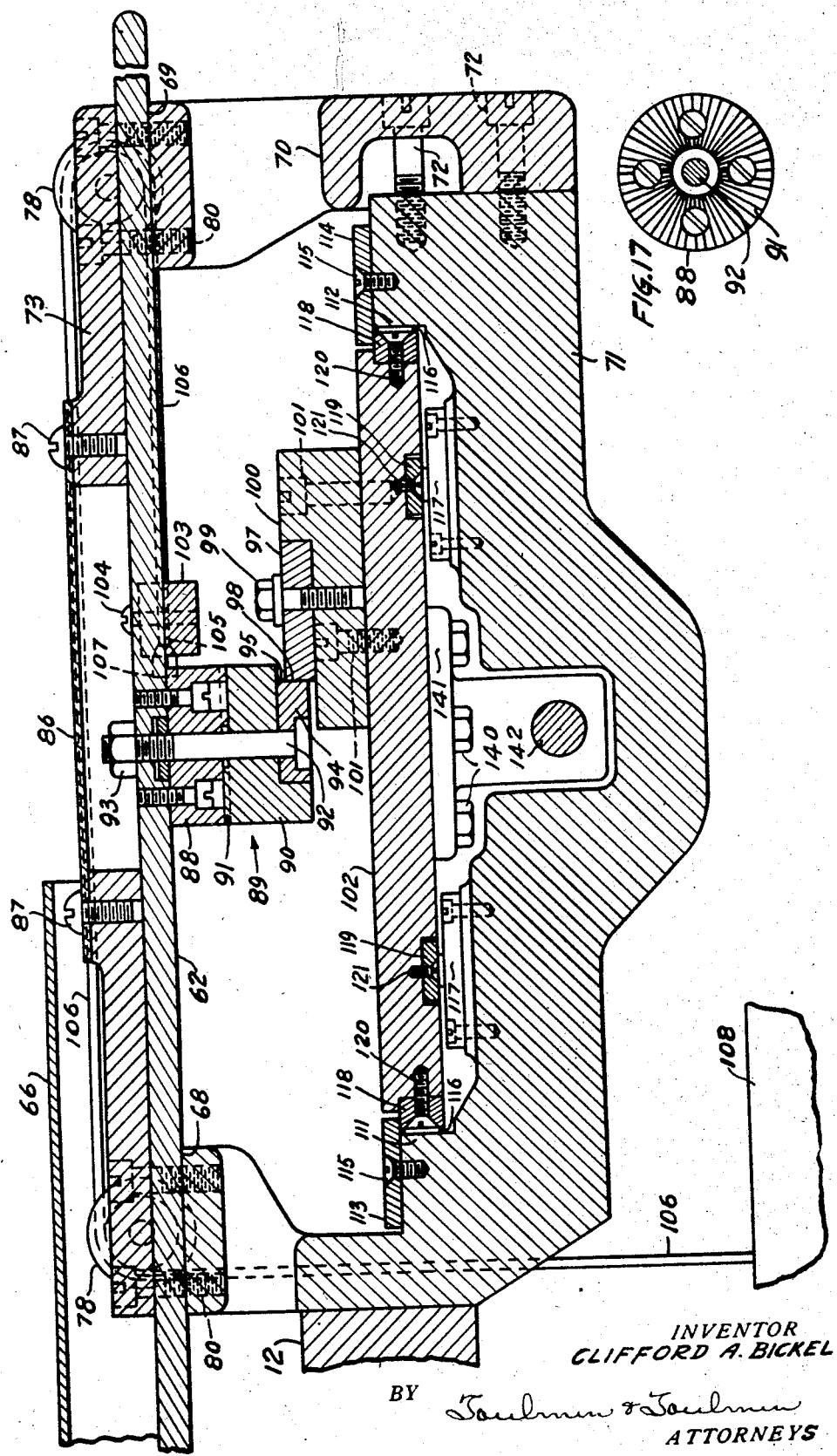

Dec. 26, 1939.  C. A. BICKEL  2,184,684
FORM PRODUCING MACHINE
Filed Aug. 18, 1937  10 Sheets-Sheet 5
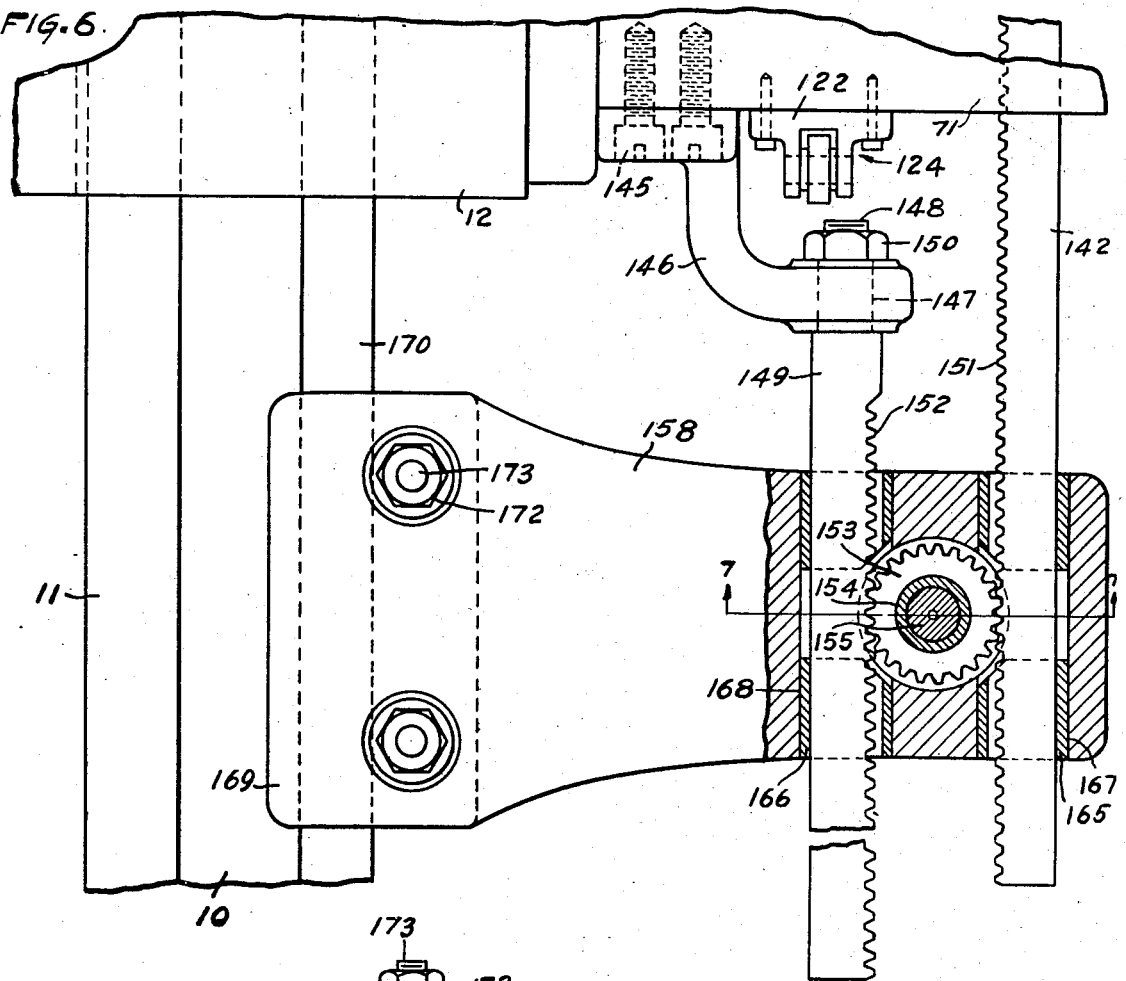
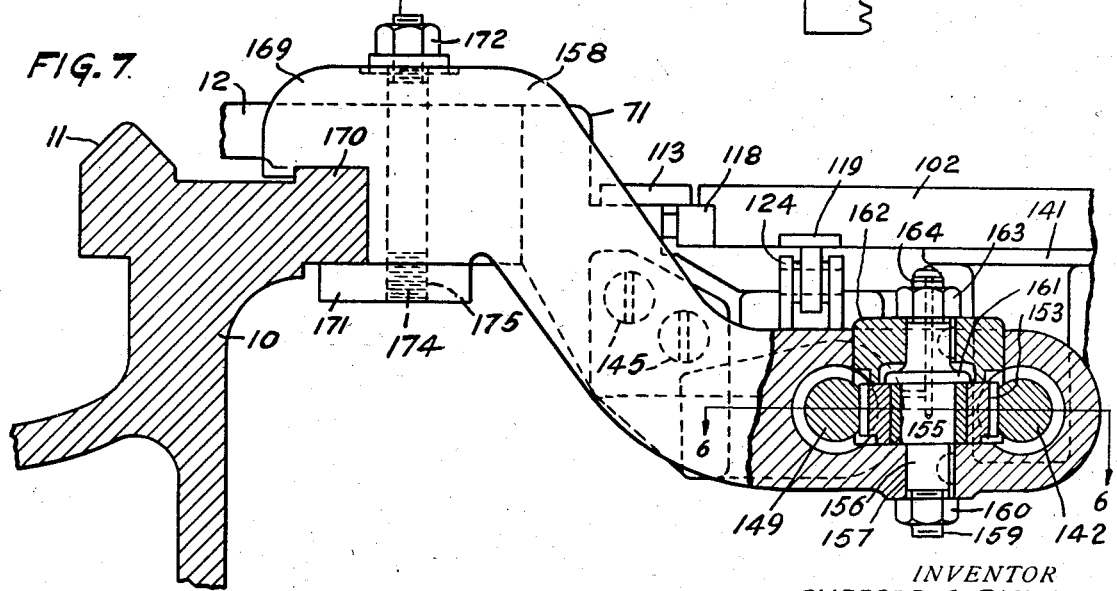
INVENTOR
CLIFFORD A. BICKEL
BY *Toulmin & Toulmin*
ATTORNEYS Dec. 26, 1939.  C. A. BICKEL  2,184,684
FORM PRODUCING MACHINE
Filed Aug. 18, 1937   10 Sheets-Sheet 6
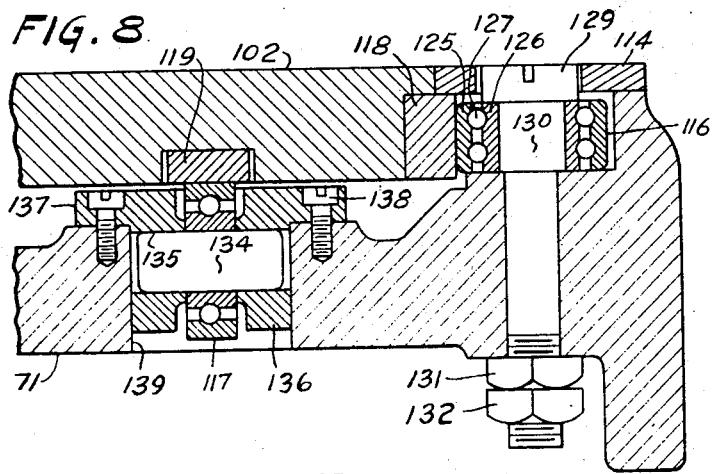
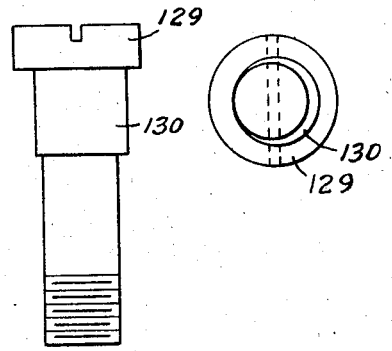
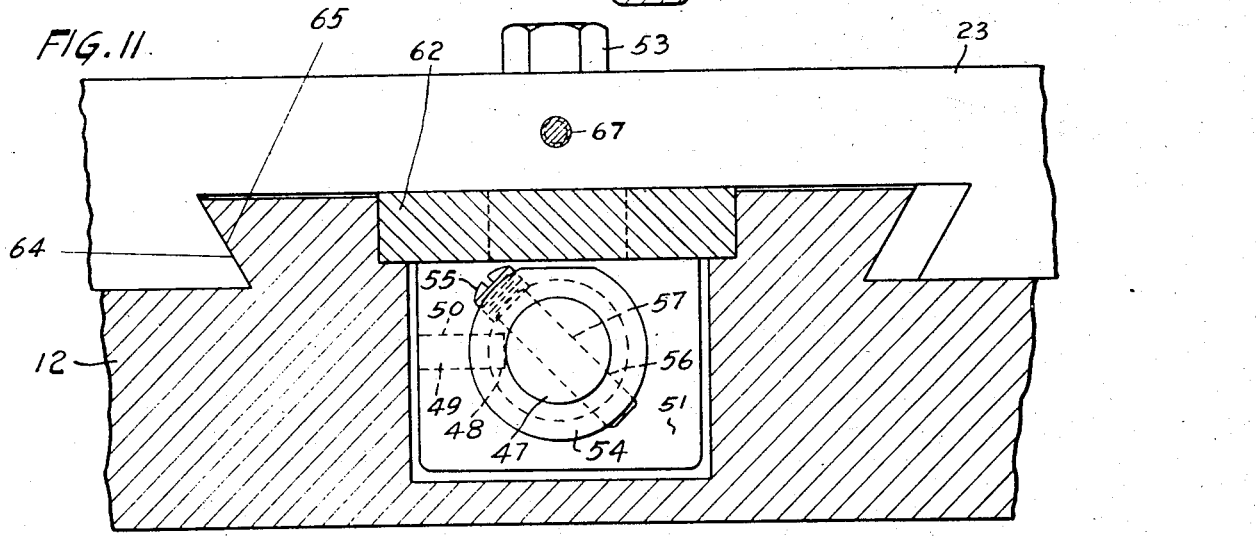
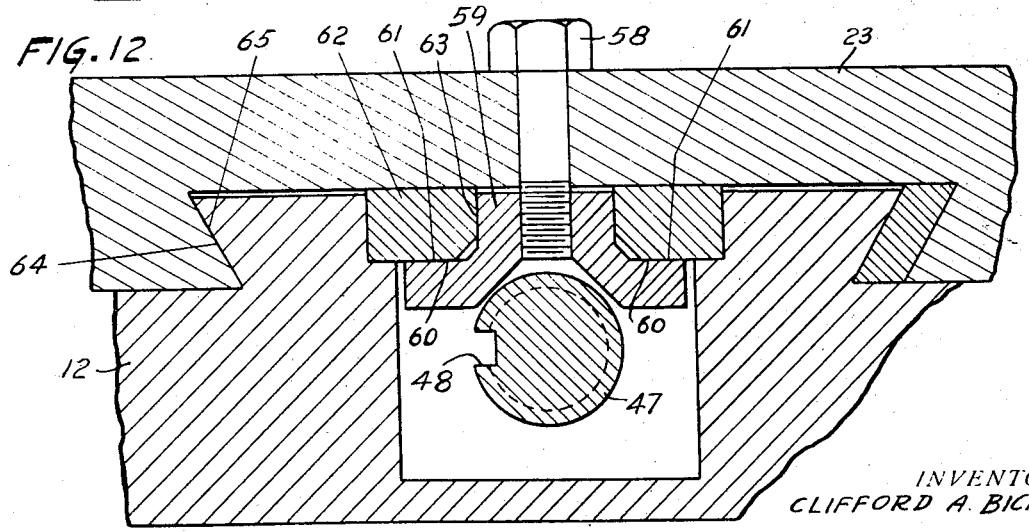
INVENTOR
CLIFFORD A. BICKEL
BY
ATTORNEYS

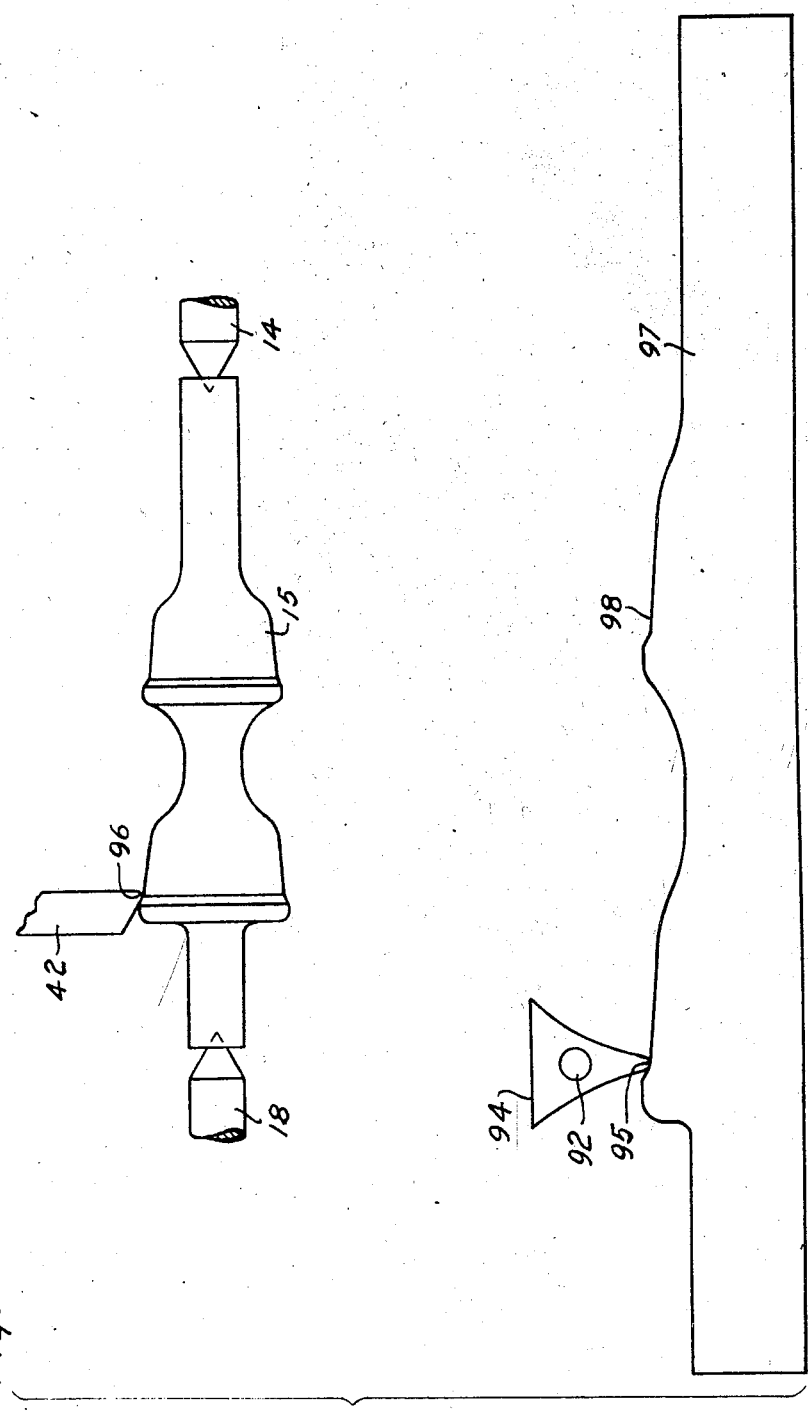

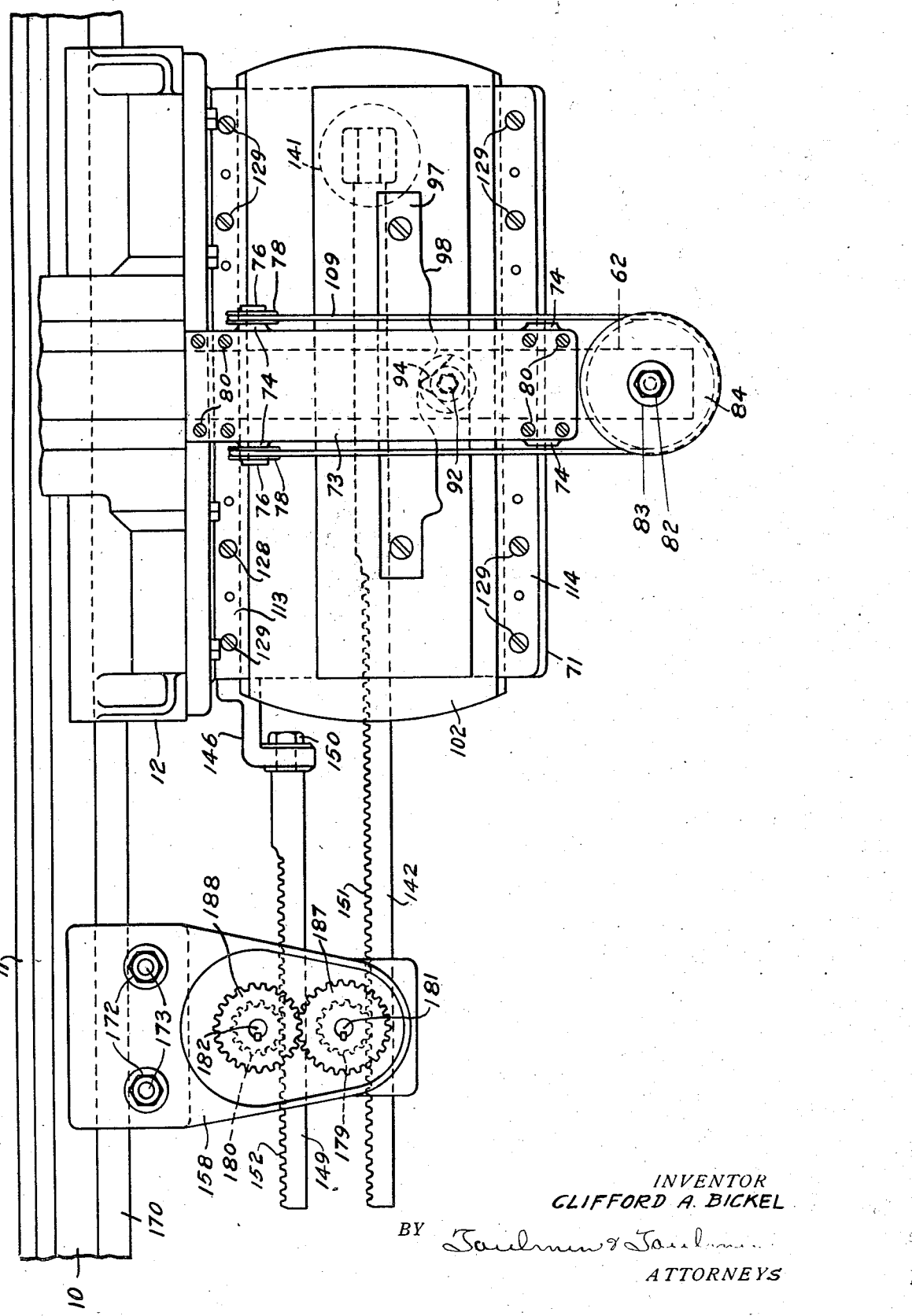

Dec. 26, 1939.　　　C. A. BICKEL　　　2,184,684
FORM PRODUCING MACHINE
Filed Aug. 18, 1937　　　10 Sheets-Sheet 9

INVENTOR
CLIFFORD A. BICKEL
BY Toulmin & Toulmin
ATTORNEYS

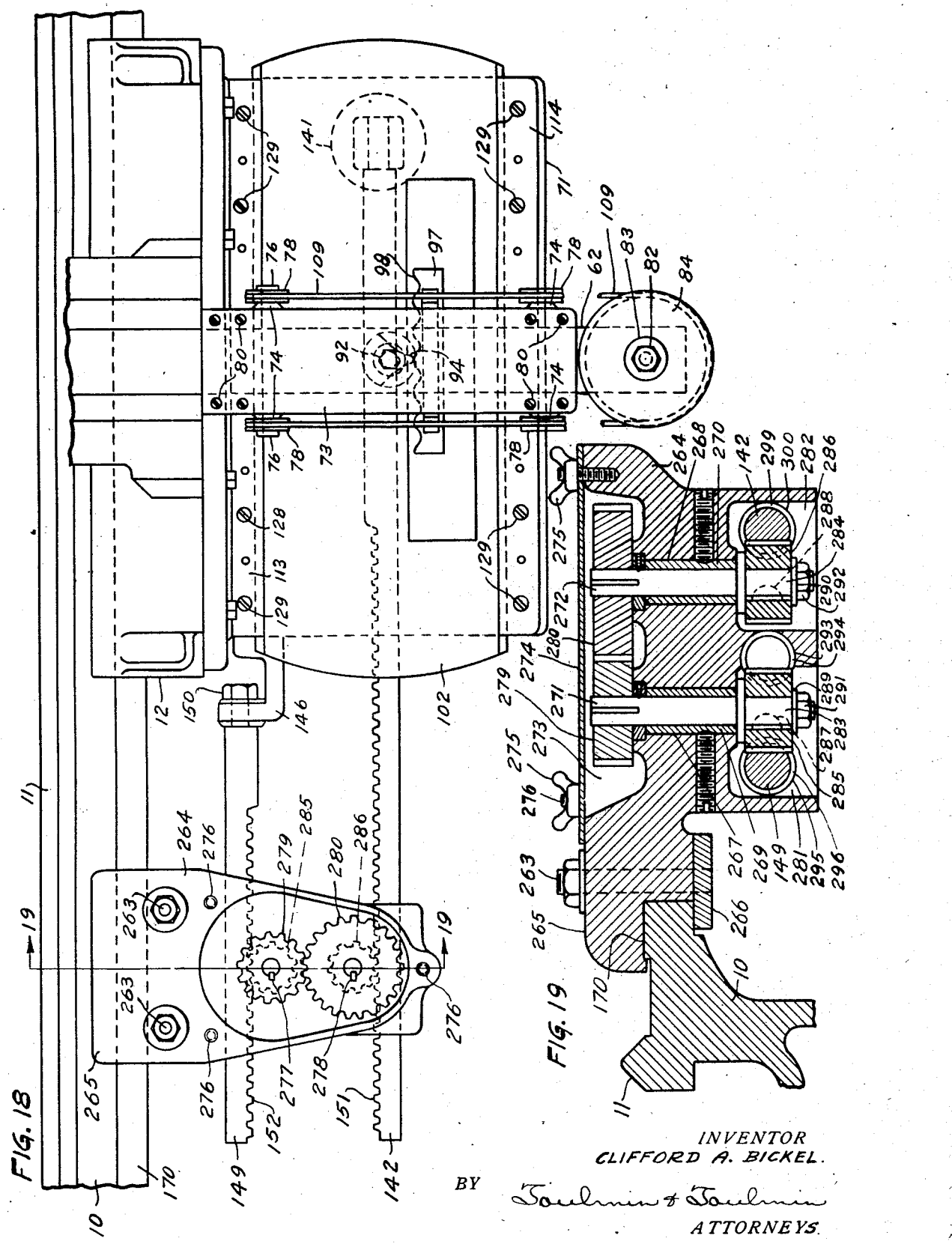

Patented Dec. 26, 1939

2,184,684

UNITED STATES PATENT OFFICE 2,184,684

FORM PRODUCING MACHINE

Clifford A. Bickel, Sidney, Ohio, assignor to The Monarch Machine Tool Co., Sidney, Ohio, a corporation of Ohio Application August 18, 1937, Serial No. 159,740

15 Claims. (Cl. 82—14)

This invention relates to turning apparatus, and in particular, to lathes for turning work-pieces having portions of different diameters.

One object of this invention is to provide a turning apparatus having an elongated template coupled by suitable mechanism with the cutting tool, the template being moved in such a manner as to produce the effect of a shorter stationary template upon the tool.

Another object is to provide a turning apparatus wherein the form given to the work-piece is imparted to the cutting tool by means of an elongated template which is moved relatively to the machine and in the opposite direction from the motion of the carriage carrying the cutting tool, in such a manner as to reproduce a shorter work-piece than the template.

Another object is to provide a turning apparatus of the type previously described, wherein the elongation of the template makes it possible to permit the follower or tracer to follow the gradual curves of the template in an easy manner, whereas the cutting tool produces abrupt curves which it would be difficult for a stationary template and follower to reproduce.

Another object is to provide a turning apparatus wherein the form given to the work-piece is obtained from a template, wherein the height of the contours of the template correspond to those of the work-piece, but the length of the template is greater than that of the work-piece, thereby enabling the follower or tracer to move up and down along the more gradual contours of the elongated template to produce more abrupt contours upon the work-piece.

Another object is to provide such an apparatus, wherein the angle of the follower or tracer to the template is adjustable in order to increase the ease of movement of the tracer along the template.

Another object is to provide an apparatus of the above description, wherein the contour of the head of the tracer is the same as the contour of the end of the cutting tool which engages the work-piece.

Another object is to provide a turning apparatus employing a template of greater length than the work-piece, and with mechanism to move the template, this mechanism having interchangeable gearing for varying the ratio of the drive thereof.

Another object is to provide a turning apparatus, wherein the form given to an elongated work-piece is produced by means of a shorter template moved in the same direction as the carriage and cutting tool, but at a slower speed.

In the drawings:

Figure 2 is a vertical section in the plane of the cross slide screw, taken substantially along the line 2—2 in Figure 1.

Figure 3 is a rear elevational view, partly in section and partly broken away, showing the template-carrying mechanism, looking substantially in the direction of the line 3—3 in Figure 1.

Figure 5 is an enlarged sectional view of the right-hand end of Figure 2.

Figure 6 is a top plan view, partly broken away, in the plane of the lines 6—6 in Figure 7, showing the geared bed bracket.

Figure 7 is a side elevation of the bed bracket shown in Figure 6, in section partly along the line 7—7 in Figure 6.

Figure 8 is a section along the line 8—8 in Figure 4, showing the anti-friction bearings for supporting the template slide.

Figure 9 is a side elevation of one of the eccentric studs shown at the right-hand side of Figure 8, for adjustably supporting certain of the anti-friction bearings for the template slide.

Figure 10 is a bottom plan view of the eccentric stud shown in Figure 9.

Figure 11 is a cross section along the line 11—11 in Figure 2, showing the details of the connection between the cross slide screw and the draw bar.

Figure 12 is a cross section along the line 12—12 in Figure 2, showing the arrangement for releasably locking the draw bar to the cross slide.

Figure 13 is an enlarged plan view of a typical work-piece and the elongated template used in the machine of this invention for producing such a work-piece.

Figure 14 is a top plan view of a modification of a portion of the machine shown in Figure 1, with provision for altering the driving ratio of the gearing for moving the template slide and arranged for boring a work-piece.

Figure 17 is a bottom plan view of the upper member of the saw tooth clutch for supporting the template follower, the lower portion being removed for clearness of showing.

Figure 18 is a top plan view of a modification of the machine shown in Figure 1 for turning an elongated work-piece from a shorter template moved in the same direction as the carriage and cutting tool, but at a slower speed.

Figure 19 is a vertical section along the line 19—19 in Figure 18.

General construction

In general, the turning apparatus of this invention consists of a machine, such as a lathe, with a longitudinally movable carriage having a tool slide connected by a draw bar to a follower or tracer which engages a template. The template, however, is elongated so that while its contours correspond in height to corresponding radii of the work-piece, the length is very much increased. Mechanism is provided for moving the template in the opposite direction to the motion of the carriage so as to cause its resultant effect upon the cutting tool to correspond to a shorter stationary template.

For reciprocating the template a bed bracket is attached to the bed of the machine and has a gear meshing with a pair of racks. One rack is secured to the carriage and the other to the slide upon which the template is mounted. As a consequence, when the carriage moves in one direction its rack rotates the gear, which in turn, actuates the second rack to move the template slide and template in the opposite direction. A modification shown in Figure 14 provides gearing upon a pair of shafts in such a manner that the ratio of the drive may be varied from one-to-one ratio of the apparatus shown in Figure 1. The taper slide is provided with anti-friction bearings, which serve to eliminate much of the friction which would otherwise occur in such apparatus.

Hitherto, it has been very difficult to cut a work-piece from a template where the curves or angles of cut are very steep. Under such conditions, it is difficult to make a tracer or follower follow the template accurately and cause the tool to accurately reproduce the contour of the template. The present invention employs an elongated template which transforms the steep template curves ordinarily required into curves of gradual inclination, thereby enabling the follower or tracer to follow the template easily and accurately. To facilitate still further the action of the machine, the follower or tracer is mounted upon an adjustable support so that it can be arranged at the most favorable angle relatively to the template.

Turning apparatus with fixed template driving ratio

Figure 1:
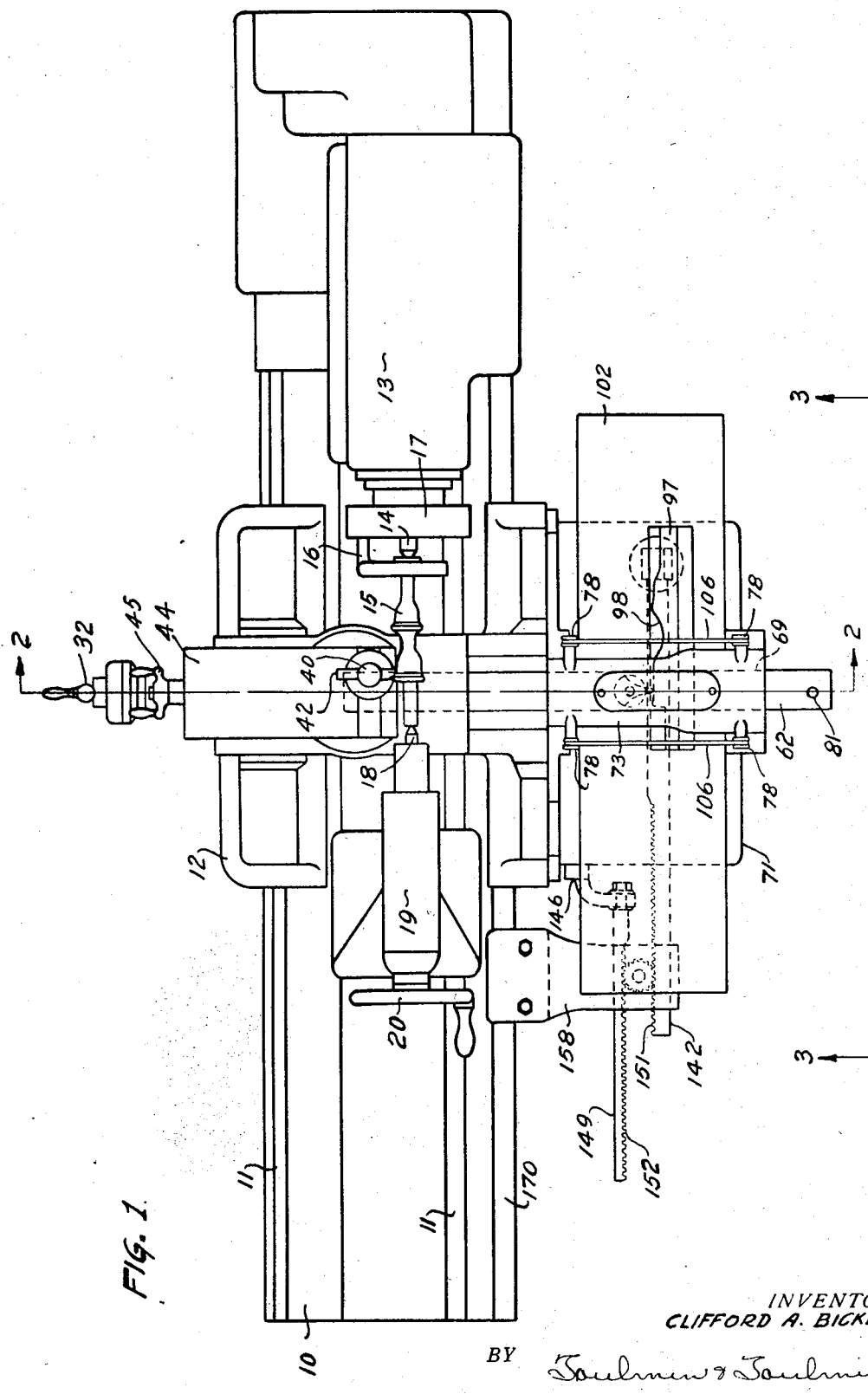
Figure 1 is a top plan view of a turning apparatus according to the present invention, with the elongated template and its associated driving mechanism having a fixed one-to-one driving ratio arranged for turning a work-piece.

Referring to the drawings in detail, Figures 1 to 13, inclusive, show a turning apparatus according to the present invention, in which the template is driven by mechanism having a one-to-one driving ratio. Figure 1 shows a turning apparatus, such as a lathe, having a bed 10 with longitudinally disposed ways 11 thereon. A lathe carriage, generally designated 12, is moved to and fro along the ways 11 by means of the usual lead screw (not shown) or by a conventional hand wheel and rack (not shown). The lathe is provided with a headstock 13 containing driving mechanism for rotating the live center 14 and the work-piece 15 by means of the dog 16, engaging the face plate 17 surrounding the live center 14 and the main spindle of the lathe (not shown). At its opposite end the work-piece 15 is supported upon the dead center 18, which in turn, is mounted in the tailstock 19 and movable to and fro by means of the hand wheel 20. The tailstock 19 is slidable along the bed 10 in the customary way, and may be clamped in any desired position by the devices usually provided for that purpose.

Projecting forwardly from the carriage 12 (Figure 2) is a sleeve-like hollow support 21 having a bearing sleeve 22 mounted therein. Superimposed upon the carriage 12, above the rearward portion of the support 21, is the transversely movable cross slide 23. The bearing sleeve 22 is provided with a bore 24, carrying a hollow shaft 25 terminating in a reduced diameter portion 26 with a threaded end 27, upon which is mounted a nut 28 for holding the micrometer drum 29 in engagement with the flanged portion 30 of the bearing sleeve 22. A ball thrust bearing 31 is arranged between the micrometer drum 29 and the portion 30. Mounted on the end of the reduced diameter portion 26 of the hollow shaft 25 is a ball crank 32 for rotating the shaft 25. The latter contains a bore 33 terminating in an enlargement 34, within which is mounted a threaded nut 35 engaging the threads of a shaft 36. The nut 35 is securely anchored within the portion 34 of the hollow shaft 25, which rotates within the bearing sleeve 22. The bore 33 is of such diameter as to permit the free entrance of the threaded shaft 36.

Mounted on the cross slide 23 is a support 37 for the compound rest 38. The latter is provided with a transverse slot 39 having a tool post 40, with a slot 41 for carrying a cutting tool 42 clamped in position by the clamping screw 43. The slot 39 is formed in the upper or movable slide 44 of the compound rest 38, and is moved to and fro by means of the hand crank 45 mounted upon the end of the shaft 46. The right-hand end of the threaded shaft 36 is provided with an enlargement 47, having a keyway running therealong, designated 48 (Figure 12). This keyway is engaged by the key 49 (Figure 11) mounted in the slot 50 in the bearing block 51. The latter is held in position by the pin 52 and screw 53 securing it to the cross slide 23. Mounted on the outer end of the enlargement 47 is a collar 54, secured thereto by the screw threaded pin 55 passing through the bores 56 and 57 of the collar 54 and enlargement 47, respectively (Figure 11).

Also mounted upon the cross slide 23 is the cap screw 58 (Figure 12), the threaded portion of which engages a clamp 59 having flat portions 60 engaging correspondingly flat portions 61 upon a draw bar 62, with a longitudinal slot 63 in the center thereof. The tightening of the cap screw 58 draws the clamp 59 upward, and clamps the draw bar 62 firmly to the cross slide 23 so that the two move in unison. By loosening the cap screw 58 the clamp 59 is caused to move downward and release the draw bar 62 from its grip.

Figure 4:
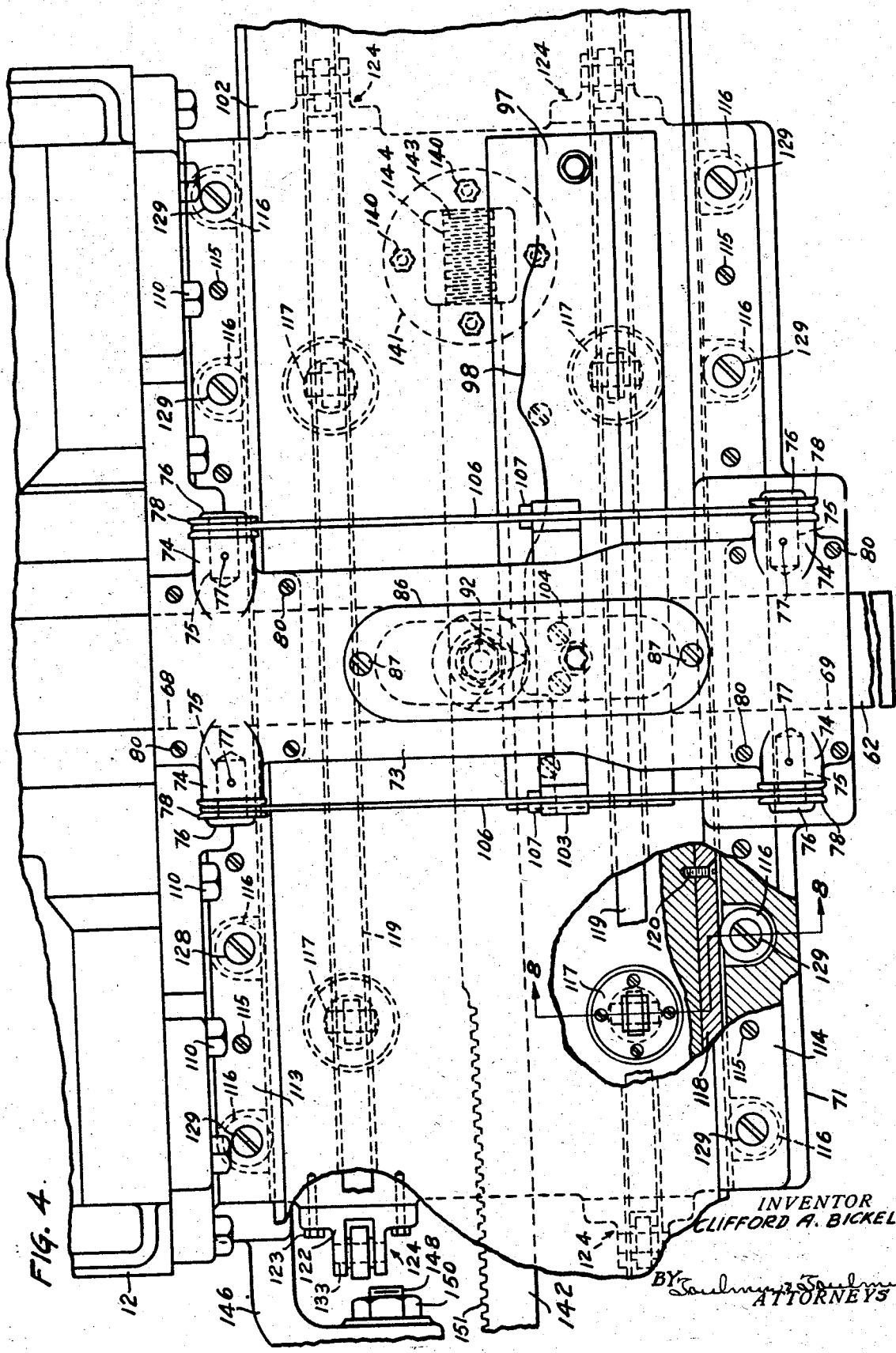
Figure 4 is an enlarged plan view, partly in section and partly broken away, of the slide which carries the template shown in Figure 1.

The cross slide 23 (Figures 11 and 12) is provided with a dove-tail groove 64 engaging a corresponding dove-tail projection 65 upon the carriage 12 in such a manner as to provide cooperating guideways for guiding the cross slide 23 in its movement to and fro across the carriage 12. A chip guard 66 is secured to the rearward end of the cross slide 23 by the screws 67 in order to protect the mechanism from the pieces of material which are cut off the work-piece 15 by the tool 42. The draw bar 62 at its rearward end passes through slots 68 and 69 in the overarm support 70, the latter being secured to the supporting bracket 71 by the screws 72. The overarm support 70 is provided with a top plate 73 having bosses 74 (Figure 4). The bosses 74 have bores 75 for receiving the studs 76, secured in place by the pins 77 and carrying the pulleys 78 for free rotation thereon. The top plate 73 is held in place by the screws 80. The outer or rearward end of the draw bar 62 is likewise provided with a threaded hole 81 (Figure 1), which is optionally employed to receive a threaded stud screw 82 having a washer 83, and rotatably supporting a large pulley 84 (Figure 14). The pulleys 78 and studs 76 are removed when the large pulley 84 is in use, and vice versa, as described in connection with the operation thereof.

The top plate 73 is provided with an elongated aperture 85 having a cover plate 86, held in place by the screws 87. The removal of this cover plate gives the operator access to the outer end of the draw bar 62, to which is attached the upper member 88 of a saw tooth clutch, generally designated 89, and having a lower member 90. The members 88 and 90 are provided with interengaging radial teeth 91, and are held together by the bolt 92 having the nut 93 upon its upper threaded portion. The bolt 92 also serves to secure the tracer or follower 94 to the saw tooth clutch member 90 (Figures 2 and 5). The outer or tracing end 95 of the tracer or follower 94 is formed to correspond with the cutting end 96 of the cutting tool 42.

By loosening the nut 93 the saw tooth clutch portions 88 and 90 may be separated from one another and rotated relatively to each other so as to adjust the angle at which the tracer or follower 94 engages the template 97. The latter is provided with a guiding edge 98, engaged by the tracer 94 and having its contour corresponding in height to the radii of the work-piece 15, but having the length thereof considerably elongated. The template 97 is secured by the cap screws 99 to the supporting block 100, which in turn, is secured by the screws 101 to the template slide 102. The anchor bar 103 is secured to the draw bar 62 by the screws 104 (Figures 4 and 5), and is provided with apertures 105 through which pass the ends of the cables 106, the free ends of which are provided with enlarged portions or knots 107. The cables 106 pass over the pulleys 78 at the opposite ends of the top plate 73, and terminate in a counterweight 108. In this manner the draw bar 62 is urged to the right by the counterweight 108 and cables 106 so that the tracer 94 is urged into engagement with the template 97 when the machine is arranged for turning work-pieces.

When the machine is arranged for boring work-pieces, however, as shown in Fig. 14, the rearward pulleys 78 and studs 76 are removed, together with the cables 106, and replaced by a cable 109 which passes around the large pulley 84 mounted upon the threaded stud 82 in the end hole 81 of the draw bar 62. Under these conditions the position of the template 97 is reversed and likewise that of the tracer 94. Under these conditions the counterweight 108 and cable 109 urge the draw bar 62 and tracer 94 into engagement with the template 97 (Figure 14). It will be understood that the arrangement of the template, pulleys and tracer shown in Figure 4 for turning are rearranged in the manner shown in Figure 14 for boring, and vice versa, so that either arrangement may be used according to the kind of work-piece being turned.

The supporting bracket 71 is secured to the carriage 12 by the cap screws 110 (Figure 4), and aligned therewith by dowel pins (not shown). The supporting bracket 71 is provided with slideways 111 and 112, provided with retaining portions 113 and 114, held in position by the screws 115. Mounted in recesses in the slideways 111 and 112 are anti-friction bearing assemblies 116 of a special type, hereinafter described in detail, and serving to support the sides of the template slide 102. The supporting bracket 71 is also provided with anti-friction bearing assemblies 117 for supporting the bottom of the template slide 102. In order to increase the wear resistance of the various parts, the sides and bottom of the template slide are provided, respectively, with hardened steel bearing inserts 118 and 119, held in place by the screws 120 and 121. The opposite ends of the template slide 102 are likewise provided with yoke-shaped brackets 122, secured thereto by the cap screws 123 and holding the end anti-friction bearing assemblies 124 (Fig. 4). The anti-friction bearing assemblies hitherto designated by the reference numerals 116, 117 and 124 are shown more in detail in Figure 8.

Each bearing assembly consists of outer and inner annular races 125 and 126, respectively, with bearing balls 127 arranged therebetween. The inner race 126 is variously mounted, as previously described according to the location of the particular bearing assembly. In the bearing assemblies 116 the inner races 126 are mounted upon stud bolts 128 or 129. In the stud bolt 128 the portion upon which the inner race 126 is mounted is coaxial with the bearing race. The stud bolts 129 are provided with eccentric portions 130, upon which the inner race 126 is mounted. Consequently, the position of the bearing and its clearance relatively to the slide 102, may be varied by loosening the nuts 131 and 132 (Figure 8), by which each stud bolt is held in position, whereupon the bolt may be turned until the bearing axis is shifted by a sufficient amount to bring the outer race 125 into sufficiently close engagement with the part which it engages.

One bearing assembly 116, on the inner side of the template slide 102, is mounted upon the plain or coaxial stud bolt 128, whereas the remainder of the bearing assemblies 116 are mounted upon eccentric stud bolts 129 (Figure 4). By this means the bearing assemblies 116 can be accurately adjusted against the sides of the slide 102, the plain or coaxial bearing assembly upon the plain stud bolt 128 serving as a point of reference.

The bearing assemblies 117 and 124 supporting the weight and vertical thrust of the template slide 102 are mounted in two different ways, as shown in Figures 4 and 5. The end bearing assemblies 124, as previously described, are supported in the yoke-shaped brackets 122 upon the axles 133. The bearing assemblies 117, arranged in the supporting bracket 71, are mounted upon pins 134 (Figure 8), the opposite ends of which are secured in the transverse bores 135 of sleeves 136, having flanges 137 engaged by screws 138 by which the sleeves are held within the bores 139 of the supporting bracket 71.

Secured by the cap screws 140 to the under side of the template slide 102 is the rack bracket 141, carrying the rack 142 (Figure 5) with the threaded end 143 of the latter secured within the threaded socket 144 of the rack bracket 141 (Figure 4). Secured to the supporting bracket 71, as by the screws 145, is another rack bracket 146, the supporting bracket 71 being, in turn, bolted to the carriage 12, as previously described. The rack bracket 146 is a right-angled bracket and is provided with a bore 147 for receiving the threaded end 148 of a rack 149, having a nut 150 thereon for retaining the rack 149 in position (Figure 6).

The racks 142 and 149 are provided with teeth 151 and 152, meshing with the teeth of a pinion 153 which is rotatably supported upon a bearing sleeve 154, surrounding a shaft 155 having its lower reduced diameter portion 156 (Figure 7) seated in a bore 157 in the outer end of the bed bracket 158. The lower end of the shaft 155 is threaded, as at 159, and carries the retaining nut 160. Immediately above the pinion 153 the shaft 155 is provided with an enlargement flange 161, and above this carries a retaining collar 162 held in position by a nut 163 upon a threaded upper end 164 of the shaft 155 (Figure 7). The racks 142 and 149 are reciprocably supported in bearing sleeves 165 and 166, mounted in horizontal bores 167 and 168 in the bed bracket 158 (Figure 6). The inner end of the bed bracket is provided with a clamping portion 169, overhanging and engaging the edge rib 170 of the lathe bed 10 (Figure 7), and having a clamping member 171 engaging the bottom edge thereof and clamped in position by tightening the nuts 172 upon the studs 173, the lower ends of which are threaded, as at 174, into the threaded holes 175 of the clamping member 171. Since the racks 142 and 149 engage opposite sides of the same pinion 153, a one-to-one driving ratio is thereby set up.

*Arrangement with variable ratio template drive*

Figure 15:
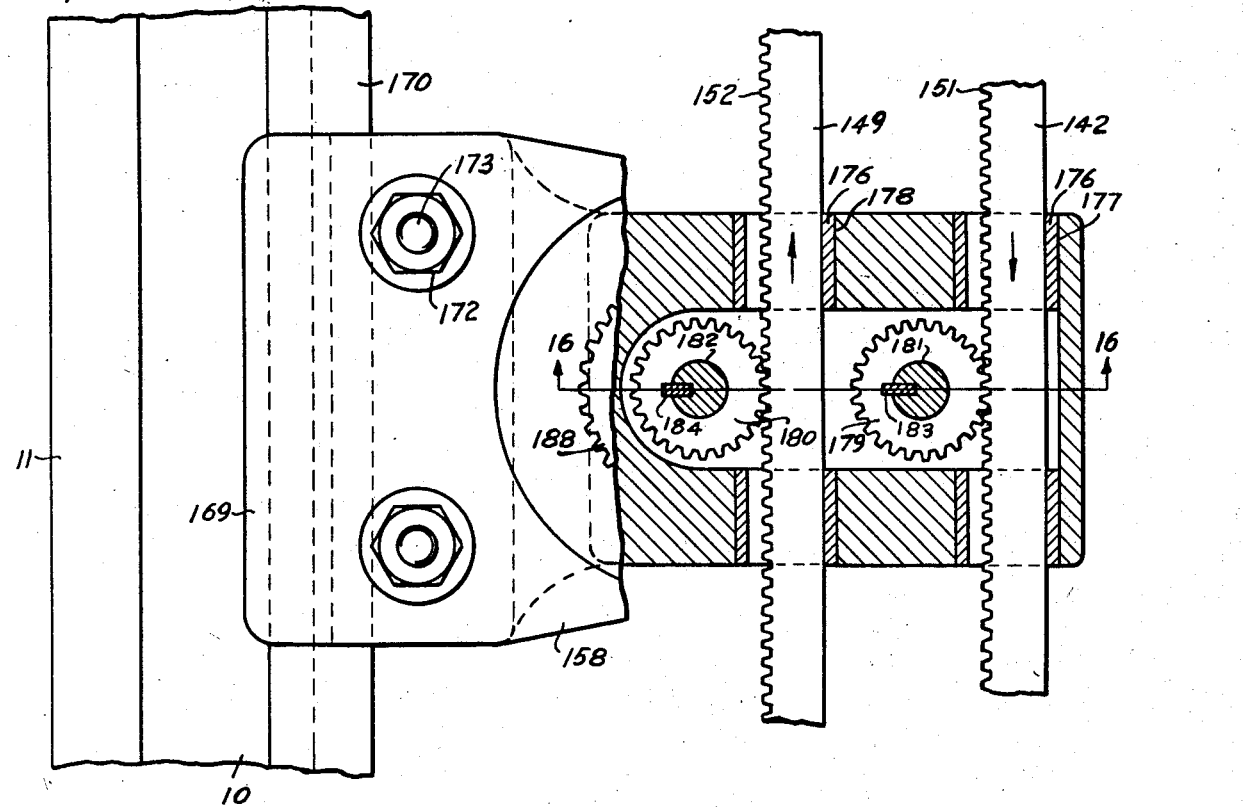
Figure 15 is an enlarged top plan view of the bed bracket shown at the left-hand side of Figure 14, and partially in section in the plane of the line 15—15 in Figure 16.
Figure 16:
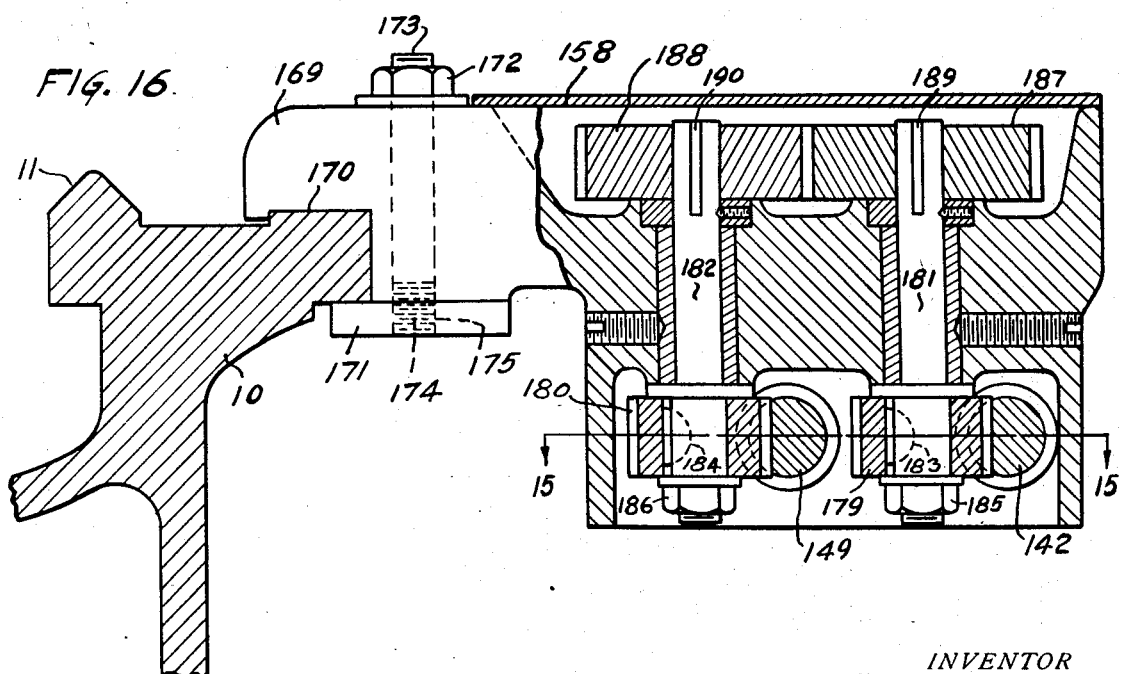
Figure 16 is a side elevation of the bed bracket shown in Figure 15, and partly in vertical section along the line 16—16 in Figure 15.

To vary the driving ratio the bed bracket is slightly modified, as shown in Figures 14 to 16, inclusive. For this purpose the racks 142 and 149 are arranged to face with their teeth 151 and 152 in the same direction (Figure 14) instead of in the opposite direction, as shown in Figure 6. These racks 142 and 149 pass through and are reciprocably supported by bearing sleeves 176 in horizontal bores 177 and 178, respectively. The teeth thereof engage and mesh with pinions 179 and 180, secured upon the lower ends of shafts 181 and 182 (Figure 16) by the keys 183 and 184 and by the nuts 185 and 186 threaded upon the lower portions of the shafts 181 and 182. The upper ends of these shafts carry interchangeable pick-off gears 187 and 188, these being given a driving connection by means of the keys 189 and 190. Obviously, the upper ends of the shafts 181 and 182 may be splined to provide a driving connection with the gears 187 and 188. In order to change the driving ratio from one-to-one to other ratios, the gears 187 and 188 are replaced by other pick-off gears having the suitable ratios as the numbers of their teeth.

*Operation*

The work-piece is arranged between the live and dead centers 14 and 18, and clamped in position with the dog 16 engaging the face plate 17. The tool 42 is clamped in the tool post 40 upon the compound rest 38, and the template 97 located on the template slide 102 either facing forwardly or rearwardly, according to whether the work-piece is to be turned or bored, respectively. The apparatus arranged for turning a work-piece is shown in Figures 1 to 5, and for boring a work-piece in Figure 14. The tracer 94 is moved inward by turning the ball crank 32 to move the threaded shaft 36 and collar 54 to the right (Figure 2), thereby permitting the counterweight 108 and cables 106 to pull the tracer 94 into engagement with the template 97, this arrangement being made (Figure 2) when the work-piece is to be turned.

When the work-piece is to be bored, the rearward pair of pulleys 78 and their studs 76 are removed, and the large pulley 84 mounted upon the outer end of the draw bar 62, as previously described. The template 97 and tracer 94 are, of course, reversed as previously described. This action occurs, of course, only when the draw bar 62 has been clamped to the cross slide 23 by tightening the screw 58 operating the clamp 59. The geared bed bracket 158 is clamped to the edge rib 170 by tightening the nuts 172.

The work-piece is started in rotation and the carriage feed operated so that the carriage 12 and tool 42 move toward the headstock, carrying with them the rack 149. When this occurs the pinion 153 rotates (Figure 6), and moves the rack 142 and template slide 102 toward the tailstock, thereby causing the template 97 and tracer 94 to move relatively to each other at twice the speed that the tool 42 moves relative to the work-piece 15. It is assumed that the tracer 94 has been adjusted by means of the saw tooth chuck 89 so that it engages the template 97 at the most favorable angle. Accordingly, the gradually varying contour of the edge 98 of the template 97 causes the tip 96 of the tool 42 to reproduce the steeply contoured surface of the work-piece 15.

To vary the ratio in the manner shown in Figure 14, the same directions are followed except that the proper pick-off gears 188 and 187 are chosen to given the desired ratio. The template 97 is made of a length corresponding with the driving ratio so that its edge contour may be made sufficiently gradual to provide accurate turning or boring of the most steeply contoured work-piece.

*Arrangement for turning elongated work-pieces from shorter templates*

To turn elongated work-pieces from a comparatively short template the machine may be rearranged as shown in Figures 18 and 19. The machine as a whole remains substantially unchanged from that shown in Figure 1, except that the rack 149 is spaced a greater distance away from the rack 142, and the bed bracket 158 is replaced by a modified geared bed bracket, generally designated 264. The geared bed bracket 264 is provided with an extension 265, overhanging the edge rib 170 of the lathe and secured thereto by a clamping member 266 with bolts 263.

The bed bracket 264 is provided with a pair of vertical bores 267 and 268 containing bearing bushings 269 and 270 for the shafts 271 and 272, the upper ends of which emerge in a depression 273 with a cover plate 274, held in position by the thumb nuts 275 engaging the threaded studs 276. The upper ends of the shafts 271 and 272 are splined at 277 and 278 to receive the intermeshing gears 279 and 280, respectively. The lower ends of the shafts 271 and 272 emerge in recesses 281 and 282. Keyed to the lower ends of these shafts, on the reduced diameter portions 283 and 284, respectively, are the pinions 285 and 286, as by the keys 287 and 288. Washers 289 and 290 and nuts 291 and 292, threaded upon the lower ends of the shafts 171 and 172, serve to retain the pinions 285 and 286 in position. The pinion 285 meshes with the teeth 152 upon the rack 149 which passes through a bore 295 having a bearing bushing 296 therein, the corresponding bore 293 with its bearing bushing 294 on the opposite side of the pinion 285 being temporarily not used. Meshing with the pinion 286 are the teeth 151 of the rack 142, the latter reciprocating in a bearing bushing 299 mounted in a bore 300 within the bed bracket 264.

The connections of the racks 142 and 149 and the mechanisms of the carriage and slide are substantially identical with those described in connection with Figure 1. In Figure 18 the apparatus is shown with the template 97 in position for turning a work-piece. The large pulley 84, which is normally removed during the turning operation and used solely in a boring operation, as shown in Figure 14, is left in position in Figure 18 to show the adaptability of the mechanism of Figures 18 and 19 for boring an elongated work-piece. For such a boring operation the mechanism is arranged as shown on the right-hand side of Figure 14, with the working edge 98 of the template 97 reversed, as described previously.

In the operation of the machine shown in Figures 18 and 19 an elongated blank is placed between the centers of the lathe and the lathe carriage 12 caused to move in the direction of the headstock, namely, to the right, in Figures 18 and 19. The consequent motion of the rack 149 to the right will rotate the pinion 285, shaft 271 and gear 279 in a clockwise direction. This rotates the gear 280 meshing therewith, shaft 272 and pinion 286 in a counterclockwise direction, thereby moving the rack 142 to the right and consequently moving the slide 102 and template 97 in the direction of the headstock, but at a slower speed. The motion of the template 97 causes its working surface 98 to engage and move the follower 94 and draw bar 62 to and fro, imparting this motion to the cutting tool. In effect, therefore, it will be seen that the template 97 gives a greatly elongated result to the cutting tool 42 so that the undulations or other changes of configuration of the template 97 are stretched out and imparted to a work-piece which is much longer than the template 97.

It will be understood that I desire to comprehend within my invention such modifications as come within the scope of the claims and the invention.

Having thus fully described my invention, what I claim as new and desire to secure by Letters Patent, is:

1. In a machine tool, a bed, a stationary support connected to said bed and positionally adjustable relatively thereto, a work-piece rotating element, a carriage, mechanism for moving said carriage relatively to said bed, a tool associated with said carriage, a guide having a contour corresponding transversely to the contour to be produced upon the work-piece but elongated longitudinally in comparison therewith, a follower engaging the contour of said guide, a connector between said follower and said tool, a rack connected to said guide, a gear operatively connected to said rack, and a second rack operatively connected to said gear on said stationary support for actuating said gear and said first-mentioned rack to move said guide relatively to said bed.

2. In a machine tool, a bed, a stationary support connected to said bed and positionally adjustable relatively thereto, a work-piece rotating element, a carriage, mechanism for moving said carriage relatively to said bed, a tool associated with said carriage, a guide having a contour corresponding transversely to the contour to be produced upon the work-piece but elongated longitudinally in comparison therewith, a follower engaging the contour of said guide, a connector between said follower and said tool, a rack connected to said guide, a gear on said stationary support meshing with said rack, and a second rack connected to said carriage and meshing with said gear for moving said first-mentioned rack and said guide in the opposite direction from said first rack in response to the motion of said carriage.

3. In a machine tool, a bed, a stationary support connected to said bed and positionally adjustable relatively thereto, a work-piece rotating element, a carriage, mechanism for moving said carriage relatively to said bed, a tool associated with said carriage, a guide having a contour corresponding transversely to the contour to be produced upon the work-piece but elongated longitudinally in comparison therewith, a follower engaging the contour of said guide, a connector between said follower and said tool, a rack connected to said guide, a gearing assembly on said stationary support having a gear meshing with said rack, and a second rack connected to said carriage and meshing with another gear of said gearing assembly, said gearing assembly being arranged to cause the guide rack to move in the opposite direction to the carriage rack in response to the motion of the carriage.

4. In a machine tool, a work-piece rotating element, a tool, a movable support for said tool, a guide having a contour for guiding the motions of said tool relatively to the work-piece, a follower engaging said guide, a holder for said follower having teeth thereon, a base having corresponding teeth engaging said holder teeth, means for selectively holding and releasing said holder relatively to said base, and a connector interconnecting said base with said tool support.

5. In a machine tool, a work-piece rotating element, a tool, a movable support for said tool, a guide having a contour for guiding the motions of said tool relatively to the work-piece, a follower engaging said guide, a rotatable holder for said follower having radial projections thereon, a base having interengaging depressions therefor, a tie member for releasably clamping said holder in engagement with said base, and a connector interconnecting said base with said tool support.

6. In combination, a template, a follower therefor, a holder for said follower, a base adapted to engage said holder, interengaging projections and depressions disposed between said holder and said base, and clamping means for clamping said holder to said base.

7. In combination, a template, a follower therefor, a holder for said follower, a base adapted to engage said holder, said base and said holder having radially dispose cooperating projections and depressions arranged therebetween, and clamping means for releasably clamping said holder to said base with said projections engaging said depressions.

8. In a machine tool, a bed, a stationary support connected to said bed and positionally adjustable relatively thereto, a work-piece rotating element, a carriage, mechanism for moving said carriage relatively to said bed, a tool associated with said carriage, a guide having a contour for guiding the motion of said tool relatively to the work-piece, a slide for supporting said guide, a follower engaging said guide, a connector between said follower and said tool, a first rack connected to said slide, gearing on said support meshing with said first rack, and a second rack meshing with said gearing and connected to said carriage, said second rack being responsive to the motion of said carriage for operating said gearing to move said first rack and said slide relatively to said bed and said carriage, said gearing on said adjustable stationary support including means for adjustably varying the driving ratio thereof.

9. In a machine tool, a bed, a stationary support connected to said bed and positionally adjustable relatively thereto, a work-piece rotating element, a carriage, mechanism for moving said carriage relatively to said bed, a tool associated with said carriage, a guide having a contour for guiding the motion of said tool relatively to the work-piece, a slide for supporting said guide, a follower engaging said guide, a connector between said follower and said tool, a first rack connected to said slide, gearing on said support meshing with said first rack, and a second rack meshing with said gearing and connected to said carriage, said second rack being responsive to the motion of said carriage for operating said gearing to move said first rack and said slide relatively to said bed and said carriage, said gearing on said adjustable stationary support including interchangeable pick-off gears for adjustably varying the driving ratio thereof.

10. In a machine tool, a bed, a stationary support connected to said bed and positionally adjustable relatively thereto, a work-piece rotating element, a carriage, mechanism for moving said carriage relatively to said bed, a tool associated with said carriage, a guide having a contour for guiding the motion of said tool relatively to the work-piece, a slide for supporting said guide, a follower engaging said guide, a connector between said follower and said tool, a rack connected to said slide, gearing on said support meshing with said rack, and a second rack meshing with said gearing and anchored to said carriage and adapted to rotate said gearing and move said first-mentioned rack and said slide oppositely in response to the motion of said carriage.

11. In a machine tool, a bed, a work-piece-rotating element, a carriage, mechanism for moving said carriage relatively to said bed, a tool associated with said carriage, a guide having a contour corresponding transversely to the contour to be produced upon the work-piece but shortened longitudinally in comparison therewith, a follower engaging the contour of the guide, a connector between said follower and said tool, and mechanism for moving said guide relatively to said bed in the same direction as said carriage but at a different speed.

12. In a machine tool, a bed, a work-piece-rotating element, a carriage, mechanism for moving said carriage relatively to said bed, a tool associated with said carriage, a guide having a contour corresponding transversely to the contour to be produced upon the work-piece but shortened longitudinally in comparison therewith, a follower engaging the contour of the guide, a connector between said follower and said tool, and mechanism for moving said guide relatively to said bed in the same direction as said carriage but at a different speed, said guide being moved at a slower speed than said carriage.

13. In a machine tool, a bed, a work-piece-rotating element, a carriage, mechanism for moving said carriage relatively to said bed, a tool associated with said carriage, a guide having a contour corresponding transversely to the contour to be produced upon the work-piece but shortened longitudinally in comparison therewith, a follower engaging the contour of the guide, a connector between said follower and said tool, and gearing operatively interconnecting said guide and said carriage for moving said guide in the same direction as said carriage but at a slower speed.

14. In a machine tool, a bed, a work-piece-rotating element, a carriage, mechanism for moving said carriage relatively to said bed, a tool associated with said carriage, a guide having a contour corresponding transversely to the contour to be produced upon the work-piece but shortened longitudinally in comparison therewith, a follower engaging the contour of the guide, a connector between said follower and said tool, a rack connected to said guide, a second rack connected to said carriage, and mechanism interconnecting said racks to move said guide in the same direction as said carriage but at a slower speed.

15. In a machine tool, a bed, a work-piece-rotating element, a carriage, mechanism for moving said carriage relatively to said bed, a tool associated with said carriage, a guide having a contour corresponding transversely to the contour to be produced upon the work-piece but shortened longitudinally in comparison therewith, a follower engaging the contour of the guide, a connector between said follower and said tool, a rack connected to said guide, a second rack connected to said carriage, and a train of gears interconnecting said racks to move said guide in the same direction as said carriage in response to the motion of said carriage but at a slower speed.

CLIFFORD A. BICKEL.